July 3, 1962
C. G. TIMMERMAN
3,041,820
DEVICE FOR POSITIONING AND PREPARING JOINED
LINKS FOR SEPARATION
Filed Aug. 11, 1959
2 Sheets-Sheet 1
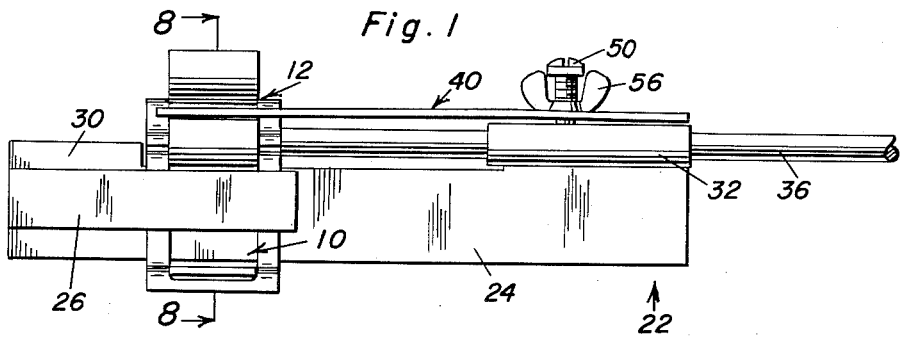
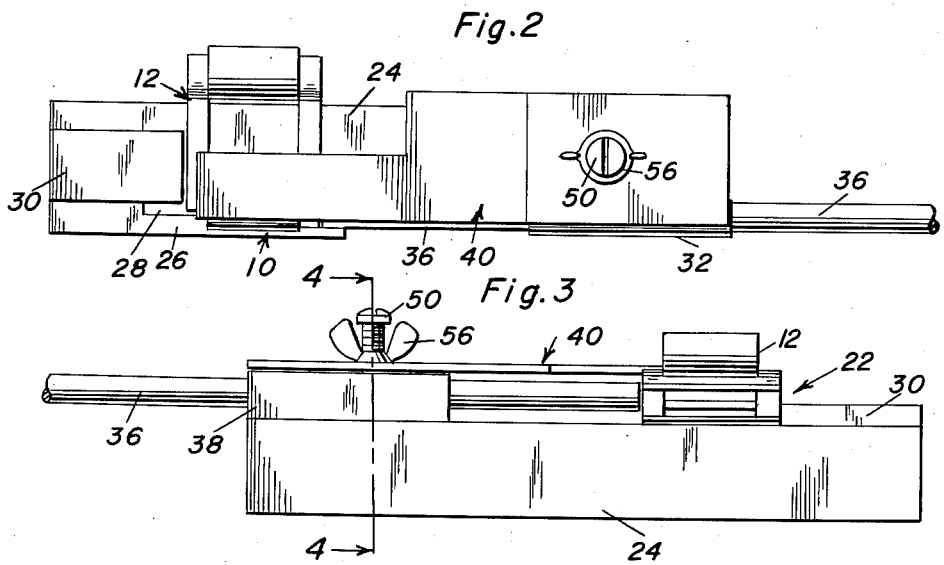
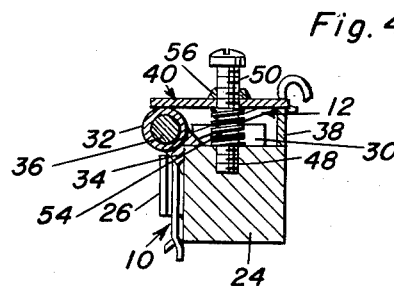
Clay G. Timmerman
INVENTOR.
BY *Clarence A. O'Brien*
*and Harvey B. Jacobson*
Attorneys July 3, 1962
C. G. TIMMERMAN
3,041,820
DEVICE FOR POSITIONING AND PREPARING JOINED
LINKS FOR SEPARATION
Filed Aug. 11, 1959
2 Sheets-Sheet 2
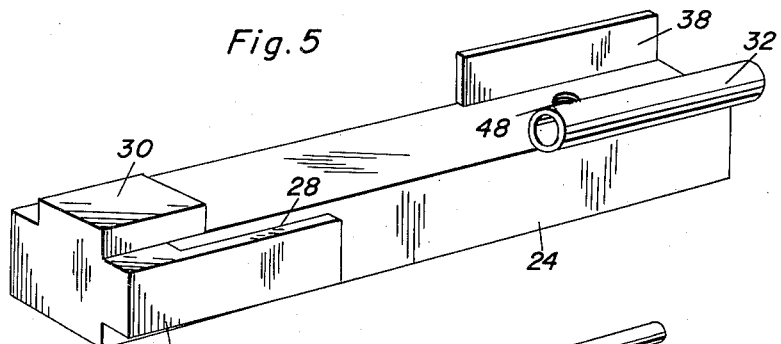
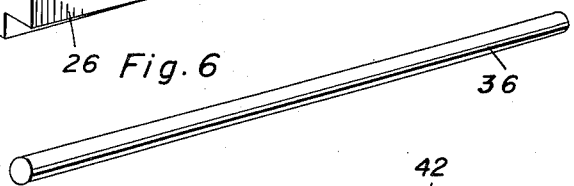
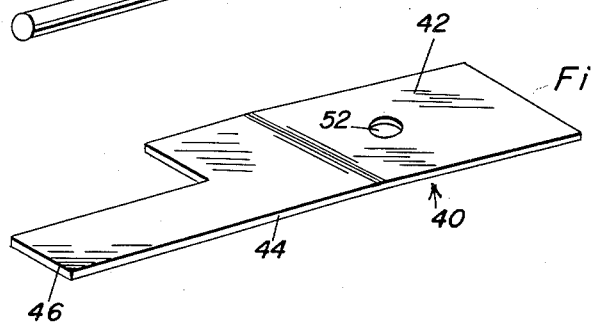
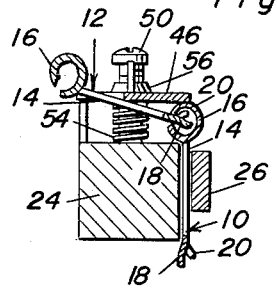
Clay G. Timmerman
INVENTOR.
BY *Clarence A. O'Brien*
and *Harvey B. Jacobson*
Attorneys

United States Patent Office 3,041,820
Patented July 3, 1962

3,041,820
DEVICE FOR POSITIONING AND PREPARING JOINED LINKS FOR SEPARATION
Clay G. Timmerman, Rte. 1, Hampton, Iowa
Filed Aug. 11, 1959, Ser. No. 833,075
5 Claims. (Cl. 59—7)

This invention relates to a device for facilitating the operations of uniting and/or separating chain links, particularly chains of the open link type such as are employed in the various drives of farm machinery, conveyors and the like.

The chains to which this invention relates are formed so that each of the links thereof is of substantially integral rectangular formation. Each link includes parallel side bars which are united at one end of the link by a transverse formation possessing the configuration of a split sleeve, while the other end of each link is formed to present an arcuate tongue carrying a laterally offset key, the tongue and key of each link being receivable within the complemental split sleeve formation of the next adjacent link, when connected links occupy predetermined angular positions, the latter constituting positions which the links do not normally occupy during their use and operation in their motion transmitting capacities. Such chains do not employ separate transverse pins or studs. The uniting or separating of such links is somewhat tedious and difficult operation to perform, since the links must assume a definite relative order or angularity and often links tend to adhere to one another so that slidable separation of the interfitting parts is difficult to accomplish.

Accordingly, it is an object of the present invention to provide a device for connecting and primarily for disconnecting chain links of the character described above, which device may be readily applied to the links of a chain when the latter is positioned in its angular disassembly position on an associated machine, and to permit the application of forces to the links to separate or unite the links in a convenient and labor saving manner.

Another object of the invention is to provide a portable device for disconnecting and uniting individual links of flat chain links of the type generally used in machinery, the device including a base block having means thereon to permit holding of a pair of links in the required longitudinal angular relation, and a punch aligned with the interconnected end formations of the links to facilitate the transverse movement of one of the links relative to the other of the links to effect the separation of the two.

A further object of the invention is to provide an extremely simple and relatively light device for separating links of chain links of the type utilized in farm machinery and the like, the device being extremely portable and readily operated so that it may be utilized in conjunction with chain links even though the chain links are associated with the machinery of which they are a part.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view showing the details of the invention in operation, only two links of a chain being illustrated for purposes of clarity;

FIGURE 2 is a plan view of the chain link separator of FIGURE 1;

FIGURE 3 is a rear elevational view of the chain link separator of FIGURE 1;

FIGURE 4 is a transverse vertical sectional view taken substantially upon the plane indicated by the section line 4—4 of FIGURE 3 and shows the specific details of the clamp plate and the hold-down bolt for retaining the clamp plate in position;

FIGURE 5 is a perspective view on an enlarged scale showing the invention with the clamp plate and drive punch thereof removed;

FIGURE 6 is an enlarged perspective view of the drive punch;

FIGURE 7 is an enlarged perspective view of the clamp plate; and

FIGURE 8 is a transverse vertical sectional view taken substantially upon the plane indicated by the section line 8—8 of FIGURE 1 and shows further relationship of the invention with respect to two links of a chain.

Referring now to the drawings in detail, it will be seen that there has been disclosed therein an open link type of chain which is widely used in the drives of agricultural machines, conveyors and the like. Such chains are formed to embody a plurality of wrought iron links, although cast steel may be used. Each link is of integral one-piece formation and is adapted to be articulately joined with adjacent links without the use of separate studs or pins.

A typical pair of chain links are illustrated in FIGURE 8 and are referred to by the numerals 10 and 12 in general. The two chain links 10 and 12 are of identical construction and each includes a pair of spaced side bars 14 which terminate at one end in a split sleeve 16 and at the other end thereof in an arcuate tongue 18 and a projecting key 20. The arcuate tongue 18 and the projecting key 20 of the link 12 is slidably disposed within the split sleeve 16 of the link 10.

In order to facilitate the connection, and when desired, the release of the links 10 and 12, there is provided the link tool which is the subject of this invention, the link tool being generally referred to by the reference numeral 22. The link tool 22 includes a base block 24 which is generally rectangular in cross-section and which is elongated. Projecting outwardly from one side of the base block 24 at one end thereof is an L-shaped chain link retaining finger 26 which has the major portion thereof spaced from and disposed parallel to a side of the base block 24, the finger 26 and the base block 24 combining to form a vertically disposed slot 28 for the reception of the side bars 14 of a first chain link, such as the chain link 10.

The base block 24 is provided at the end thereof to which the finger 26 is connected with an upstanding block portion 30 which is secured to the upper side of the base block 24. The block portion 30 functions as a support in a manner to be described in more detail hereinafter.

A sleeve 32 extends longitudinally of the base block along one upper corner thereof. The sleeve 32, as is best illustrated in FIGURE 4, is secured to the base block 24, as by welding 34. The sleeve 32 is directed generally towards the finger 26 and above the finger 26 so as to be aligned with the end formations of the chain links 10 and 12. The sleeve 32 carries a punch member 36 which is of a size to be received within the sleeve 16.

A support member 38 projects upwardly from the base block 24 parallel to the sleeve 32. The heights of the sleeve 32 and the support 38 are approximately the same.

The device 22 also includes a plate which is generally referred to by the numeral 40 and is best illustrated in FIGURE 7. The plate 40 includes a generally rectangular portion 42 and an L-shaped portion 44 which are at a slight angle to each other. The L-shaped portion 44 terminates in a finger 46.

The base block 24 is provided with a threaded bore 48 intermediate the sleeve 32 and support 38. A bolt 50 is threaded into the bore 48. The bolt 50 passes through a bore 52 formed in the plate 40. When the clamp plate 40 is assembled on the base block 24, a spring 54 carried by the bolt 50 underlies the plate 40 and urges it upwardly. The clamp plate 40 is positioned by a wing nut 56 which is threaded on the bolt 50 and which overlies the plate 40.

When it is desired to separate the chain links 10 and 12, the chain links 10 and 12 are positioned as is best illustrated in FIGURE 8. The chain link 10 is vertically positioned between the finger 26 and the block 24 while the chain link 12 is angularly positioned between the clamp plate 40 and the block 24, the finger 46 of the clamp plate 40 overlying the bars 14 of the link 12 as more clearly seen in FIGURE 2. It is to be noted that the link 12 is in edge bearing engagement with the base block 30. Thus the link 12 is prevented from moving longitudinally of the base block 24 in a left direction as viewed in FIGURES 1 and 2. On the other hand, the link 10 may be displaced longitudinally of the base block 24 by a limited amount in the same direction.

When the links 10 and 12 are arranged in proper angular direction as illustrated in FIGURE 8 and the bars 14 of the link 12 are aligned with the slot of sleeve 16 of the link 10 by, for example, manually holding it against the inner edge of finger 46, a hammer blow on the punch 36 will engage link 12 through the split sleeve 16 of the other link to disrupt by the impact any adhesive resistance to separation of the interfitting end of link 12 through the split of sleeve 16 such as caused by clogging dirt, etc. Accordingly, the sleeve 16 and link 10 may then be easily displaced manually in a right hand direction as viewed in FIGURES 1 and 2 with respect to link 12 along the punch 36 for complete separation of the links, the link 12 being held in its lefthand position against the block by the punch. Thereafter, withdrawal of the punch will release link 10. The chain links may be joined by a reversal of the process.

It will be readily apparent that the device 22 is readily portable and may be utilized on a chain which is on existing piece of machinery. The operation of the device is extremely simple and substantially foolproof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for detaching chain links having split sleeves at one end thereof and projections at their other ends for lateral movement into or separation from a split sleeve of an adjacent link when disposed at a predetermined angle thereto, comprising, base means, vertically disposed slot means mounted on the base means for receiving an intermediate portion of one chain link with the split sleeve thereof projecting above the base means, said slot means permitting lateral displacement of said one chain link in one direction, limit means mounted on top of said base means for barring lateral movement in a direction opposite to said one direction of a second chain link connected to said one chain link by reception of its other end projections within the split sleeve of the one chain link, adjustable means mounted on top of the base means in spaced relation to the limit means to present an abutment edge at one end portion adjustably spaced above the base means against which the second chain link may be held at said predetermined angle to said one chain link, and punch means slidably mounted on top of the base means in axial alignment with said split sleeve for impact engagement with said second chain link to facilitate manual displacement of the split sleeve of said one chain link on the punch means for separation from the second chain link within the slot means in said one direction, in response to a hammer blow applied to the punch means.

2. The combination of claim 1 wherein said adjustable means comprises a bent plate, spring means biasing the plate upwardly with respect to the base means adjacent an end of the plate opposite said one end portion and adjustable nut means positioning the plate in spaced relation above the base means against the bias of the spring means.

3. The combination of claim 2 wherein said slot means comprises an L-shaped link retaining finger projecting from a vertical side at one end of said base means to define a vertical slot through which said one chain link extends.

4. The combination of claim 1 wherein said slot means comprises an L-shaped link retaining finger projecting from a vertical side at one end of said base means to define a vertical slot through which said one chain link extends.

5. A device for detaching interconnected links of a chain that are laterally separable only when disposed in a predetermined angular relation to each other, comprising, a supporting base having means for movably receiving one link in a vertical position for lateral displacement in one direction, and limit means for laterally immobilizing a second interconnected link in a direction opposite to said one direction, means mounted on said base providing an adjustable stop for limiting angular displacement of said second link relative to said one link to said predetermined angular relationship, and impact means guidingly mounted on said base and movable in said opposite direction into said one link for impact with said second link to facilitate manual displacement of said one link in said one direction relative to the second link.

References Cited in the file of this patent

UNITED STATES PATENTS

| 2,379,001 | Hage | June 26, 1945 |
| 2,622,389 | Sjostrom et al. | Dec. 23, 1952 |
| 2,691,267 | Baber | Oct. 12, 1954 |

FOREIGN PATENTS

| 489,183 | Canada | Dec. 30, 1952 |